United States Patent [19]

Lawhon et al.

[11] 4,332,719
[45] Jun. 1, 1982

[54] METHOD AND APPARATUS FOR ISOLATING PROTEIN FROM GLANDLESS COTTONSEED

[75] Inventors: James T. Lawhon, College Station; Larry J. Manak, Bryan, both of Tex.

[73] Assignee: Texas A&M University, College Station, Tex.

[21] Appl. No.: 153,100

[22] Filed: May 27, 1980

[51] Int. Cl.³ .................................................. A23J 1/14
[52] U.S. Cl. ...................................... 260/123.5; 426/656
[58] Field of Search ....................... 426/656; 260/123.5

[56] References Cited

U.S. PATENT DOCUMENTS

| | | | |
|---|---|---|---|
| 1,955,375 | 4/1934 | Cone et al. | 260/123.5 |
| 2,607,767 | 8/1952 | Vassel | 260/123.5 |
| 3,728,327 | 4/1973 | Frazeur et al. | 260/123.5 |
| 3,736,147 | 5/1973 | Iacobucci et al. | 260/123.5 X |
| 3,814,748 | 6/1974 | Olson et al. | 260/123.5 |
| 3,995,071 | 11/1976 | Goodnight, Jr. et al. | 426/656 X |
| 4,018,752 | 4/1977 | Bühler et al. | 426/656 X |
| 4,072,670 | 2/1978 | Goodnight, Jr. et al. | 260/123.5 |
| 4,075,361 | 2/1978 | Oberg | 426/656 X |
| 4,088,795 | 5/1978 | Goodnight, Jr. et al. | 426/656 X |
| 4,091,120 | 5/1979 | Goodnight, Jr. et al. | 426/656 X |
| 4,151,310 | 4/1979 | Mattil et al. | 426/656 |

FOREIGN PATENT DOCUMENTS

| | | |
|---|---|---|
| 1421623 | 1/1976 | United Kingdom . |
| 1519363 | 7/1978 | United Kingdom . |

OTHER PUBLICATIONS

Lawhon, J. T., et al., J. Food Sci. 42, pp. 389–394, (1977).
Berardi, L. C., et al., Food Technology 23, pp. 1305–1312, (1969).
Martinez, W. H., et al., 3rd International Congress of Food Science & Technology, Potential of Cottonseed: Products, Composition, and Use, Wash. D.C., Aug. 9–14, 1970.
Omosaiye, O., et al., J. Food Sci. 43, pp. 354–360, (1978).
Lawhon, J. T., et al., J. Food Process Engr., 1, pp. 15–35, (1977).
Lawhon, J. T., et al., J. Food Sci. 44, pp. 213–219, (1979).
Lawhon, J. T., et al., J. Food Sci. 43, pp. 361–369, (1978).
Omosaiye, O., et al., "Low–Phytate, Full–Fat Soy Protein Concentrate by Ultrafiltration of Aqueous Extracts of Whole Soybeans", Presented at 62nd Annual Meeting of AACC, San Francisco, 1977.

Primary Examiner—Robert A. Yoncoskie
Attorney, Agent, or Firm—Arnold, White & Durkee

[57] ABSTRACT

A storage protein isolate and a nonstorage protein concentrate are produced in a method where the nonstorage protein is extracted from an oilseed flour, such as cottonseed, using water. The pH of the nonstorage protein extract is then adjusted to about 4 to precipitate a nonstorage protein curd, leaving a nonstorage protein-containing whey. The nonstorage protein curd can then be passed through a spray dryer to produce the nonstorage protein concentrate. The residue from the original extraction step includes storage protein which is extracted in an alkali solution. After removing insoluble residues, the storage protein extract is intermixed with the nonstorage protein whey and subjected to filtration through a semipermeable membrane to produce the storage protein isolate.

9 Claims, 1 Drawing Figure

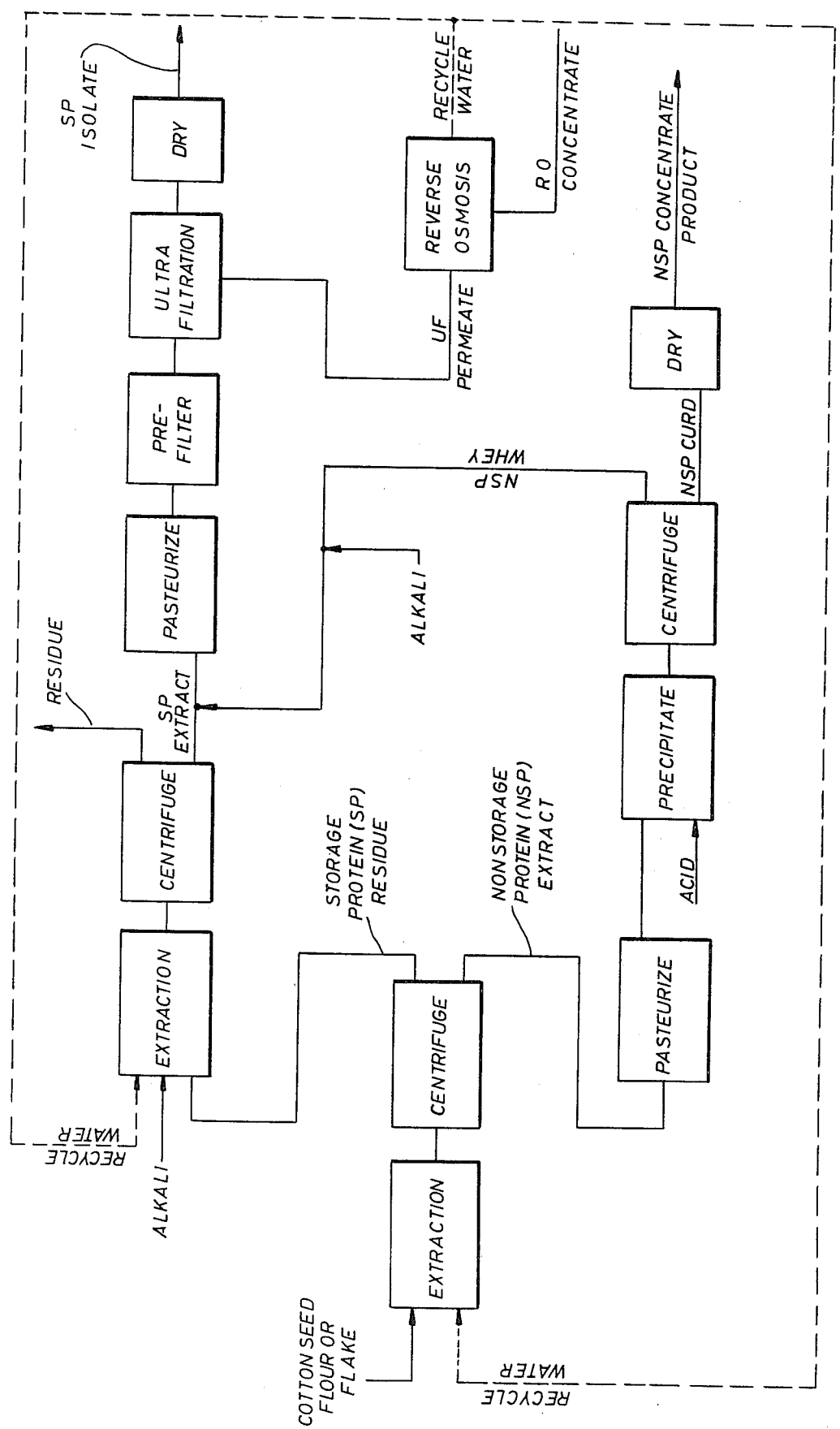

METHOD AND APPARATUS FOR ISOLATING PROTEIN FROM GLANDLESS COTTONSEED

BACKGROUND OF THE INVENTION

1. Field of the Invention

This invention relates generally to the isolation of protein from an oilseed flour or flakes. More particularly, the invention relates to the isolation of nonstorage and storage protein, from an essentially defatted, glandless or deglanded cottonseed flour or flake.

2. The Prior Art

As reported in the *Journal of Food Science*, Vol. 42, No. 2, pages 389-394 (1977), prior work has been conducted concerning the isolation of nonstorage protein and storage protein from glandless cottonseed. In this prior work, the cottonseed protein was divided into nonstorage protein and storage protein fractions by first extracting the cottonseed flour with tap water to solublize the nonstorage protein and other water soluble components. The initial extraction was followed by centrifugation and resuspension of the solids in water to more completely separate the nonstorage fraction. The two nonstorage protein extracts were mixed, pasteurized and prefiltered. Then, the nonstorage protein extract was passed over a semipermeable membrane to concentrate the nonstorage protein, which was then passed through a spray dryer to produce a dry nonstorage protein product. Storage protein extract was prepared by reextracting residue from the nonstorage protein extraction with tap water adjusted to pH 10 with sodium hydroxide. Extraction was continued for about thirty minutes after pH stablization, after which time the solution was centrifuged to remove insolubles. After centrifugation, resuspension of the insolubles at the same pH was conducted to more completely remove the storage protein fraction. These two storage protein extracts were mixed, pasteurized and prefiltered, before being passed over a semipermeable membrane to produce a storage protein isolate. This storage protein isolate, like the nonstorage protein concentrate, was passed through a spray dryer to produce a dry storage protein product.

In this prior method, both the nonstorage protein and storage proteins were extracted separately and then each extract was processed by semipermeable membranes, i.e. ultrafiltration. By that procedure, essentially all of the carbohydrates were removed along with the nonstorage protein in the initial water extraction. These carbohydrates raised the viscosity of the nonstorage protein extract and presented certain difficulties in ultrafiltration processing, primarily in a greatly reduced flow rate through the semipermeable membrane. Moreover, the final nonstorage protein product contained substantial undesirable carbohydrates and only about 70% protein.

Other more conventional methods of producing oilseed proteins involves extracting protein from oilseed flakes, meal or flour and then separating insoluble residuals from the liquid extract by centrifugation. The pH of the liquid extract is then adjusted to the point of minimum protein solubility with an appropriate acid to precipitate the maximum amount of nonstorage protein in the form of a curd. These procedures generally involve a lengthy process and result in a liquid whey by-product containing significant amounts of nitrogen, carbohydrates and other nutrients. Such whey by-products may pose an environmental problem from a disposal standpoint, while at the same time the disposal of this whey by-product involves the loss of valuable protein and nutrients. Additionally, these conventional methods require continuing process water since the liquid component of the whey by-product is not reused.

Another process for isolating protein from cottonseed is disclosed in U.S. Pat. No. 3,814,748. Other processes for isolating protein from other oilseeds are disclosed in U.S. Pat. Nos. 3,995,071, 4,088,795, 2,607,767, 1,955,375, 4,075,361, 3,728,327, 3,736,147, 4,151,310, and 4,072,670 and in British Pat. Nos. 1,421,623 and 1,519,363.

SUMMARY OF THE INVENTION

The present invention overcomes various shortcomings in the prior art by producing a protein isolate from essentially glandless cottonseed, where the isolate is at least 90% protein, as determined by the formula $6.25 \times$ the amount of total nitrogen. This isolate is formed from cottonseed storage protein which is alkali soluble and also from a nonstorage protein whey component which is derived by separation from a nonstorage protein curd.

Additionally, this invention produces a nonstorage protein product derived by extracting nonstorage protein from defatted oilseed flour or flakes, preferably cottonseed, by placing the oilseed flour or flakes in an aqueous solution to solubilize the nonstorage protein. Then, a storage protein-containing residue is separated from the nonstorage protein solution. The nonstorage protein is removed from that solution by adjusting the solution's pH to at or near the isoelectric point for nonstorage protein, and then separating the nonstorage protein curd precipitate from the solution, leaving a nonstorage protein whey. This whey component is then added to a storage protein extract, as later described.

This method further includes extracting storage protein from the residue after separating the nonstorage protein solution, by placing that residue in an alkaline solution having a pH greater than about 8 to solubilize the storage protein. Insoluble residue is removed from this storage protein solution, and then this solution is intermixed with the nonstorage protein whey. Thereafter, protein is separated from this mixture by passing the protein mixture through a semipermeable membrane system.

In a more preferred aspect of the invention, the alkaline solution is established to solubilize the storage protein by the use of either potassium hydroxide or sodium hydroxide.

In another preferred aspect of the invention, the pH of the alkaline solution is adjusted to greater than about 9 to solubilize the storage protein, and most preferably the pH is adjusted to about 9.5.

In another preferred aspect of the invention, the permeate from the filtration cycle of the mixture of nonstorage protein whey and the alkaline solution including solubilized storage protein is passed through a reverse osmosis filtration system to achieve an essentially clarified water. Then this water is used as process water to form the aqueous solution for extracting the nonstorage protein from the oilseed flour or flake and also to form the alkaline solution for extracting storage protein from the initial residue after the removal of the nonstorage protein extract.

Accordingly, the present invention provides numerous advantages over prior methods for isolating protein from oilseeds, in particular cottonseed. For example, the present invention provides the following advantages over the methods reported in the *Journal of Food Science*, Vol. 42, No. 2, pages 389-394 (1977):

1. The yield of storage protein is increased by about 40%, however with a corresponding decrease in the yield of nonstorage protein product to a level which is roughly equivalent to the yield from the more conventional isolation processes by isoelectric precipitation. The storage protein product is an "isolate" by definition, i.e. having a protein content of 90% or higher on a dry weight basis, and would therefore be marketed at a higher price. Additionally, the nonstorage protein product from the present invention is lower in carbohydrates, i.e. approximately 8% instead of approximately 18%, and is higher in protein, approximately 80% instead of approximately 70%, than the nonstorage protein product from the prior process.

2. The storage protein isolate should be slightly lighter in color than storage protein from the older process, and therefore provides a greater consumer attraction. This slightly lighter color is apparently attributable to the nonstorage protein whey added to the storage protein extract, since this whey is somewhat lighter in color and is rich in lysine.

3. The storage protein isolate is higher in lysine than storage protein isolate from any of the prior known isolation processes, increasing from approximately 2.7-3.0% of the older process without nonstorage protein whey to approximately 3.3-3.7% with the nonstorage protein whey included.

4. The present invention enables an economical membrane processing rate.

5. The process of the present invention has no effluent waste stream since its reverse osmosis permeate is extremely low in total solids and can be reused to provide most of the process water requirements.

The invention also provides several advantages over the other more conventional procedures of the prior art:

1. The present invention reduces the processing time.

2. The isolate yield is increased, since whey proteins are recovered as a storage protein isolate.

3. Process water requirements are greatly reduced.

4. The storage protein isolate possesses enhanced nutritional characteristics.

These and other advantages and meritorous features of the invention will be more fully appreciated from the following detailed description and the appended claims.

BRIEF DESCRIPTION OF THE DRAWINGS

FIG. 1 is a flow diagram illustrating the process steps of the present invention.

DETAILED DESCRIPTION OF THE PREFERRED EMBODIMENT

The present invention relates primarily to the separation of storage protein and nonstorage protein from the flour or flakes of deglanded or glandless cottonseed. Storage protein is the major fraction of the protein in cottonseed, comprising about 2½ times that of nonstorage protein. Storage protein is alkali soluble and has a molecular weight higher than that of nonstorage protein. However, the storage protein constituent is not as high in nutritional value as the nonstorage protein, which is water soluble and precipitable at about pH 4. By the present invention, the storage protein is produced as an isolate having 90% or higher protein content, rather than as a protein concentrate having 70% or greater protein on a dry weight basis.

As shown in FIG. 1, the first step according to this invention is adding a defatted, essentially glandless or deglanded cottonseed flour or flake to water in order to extract nonstorage protein from the flour. Prior to the performance of this step, the flour or flake may be defatted in a hexane solvent to extract the oil, or alternatively, the flour or flake may be purchased already in a defatted condition.

The extraction step is performed by placing the cottonseed flour in prefiltered tap water at a ratio of about 18:1 water to flour. This extraction step is performed at ambient temperature, i.e. about 28.5° C., for about 30 to 40 minutes to solubilize the nonstorage protein and other water soluble components.

Next, the nonstorage protein extract is separated from the storage protein-containing residue by centrifugation. The nonstorage protein extract may then optionally, but desirably, be pasteurized by raising the heat above 145° F. and holding at that temperature for about 30 minutes, in order to reduce or eliminate bacterial growth during further processing or storage. As is known, the pasteurization step might alternatively be carried out at higher temperatures and shorter time periods.

After the optional pasteurization step, the pH of the nonstorage protein extract is adjusted to, at or near the isoelectric point for nonstorage protein, i.e. approximately at pH of 4. The adjustment of the pH can be accomplished by any suitable acid, preferably hydrochloric acid or phosphoric acid. Adjustment of the pH to the isoelectric point for nonstorage protein will cause a precipitation of the nonstorage protein as a curd, which can be separated from the remaining nonstorage protein whey by centrifugation.

The nonstorage protein curd can then be further treated by spray drying to achieve a nonstorage protein concentrate product that can be used as a nutritional and functional food ingredient, such as a whipping agent.

The storage protein-containing residue from the first centrifugation step can be subjected to an extraction by the addition of recycle water and an alkali agent. Preferably, this alkali is a hydroxide, such as sodium hydroxide and potassium hydroxide. In tests leading to the development of this invention, calcium hydroxide was also tested, but was found to be less effective in extracting storage protein from the residue. Of all these hydroxides, potassium hydroxide may be the most desirable, since it has been reported that sodium in the diet has been linked to hypertension. However, the use of sodium hydroxide in the invention is essentially equally as effective, but may be less desirable from dietary considerations.

The storage protein extraction step is most preferably carried out at a pH of about 9.5, but can be carried out in a more preferable range of about 9 to 10, and even within a broader preferred range of about 8 to 11. Higher pH's generally provide greater yields, but the ultimate color of the storage protein product is slightly darker. After the pH stabilizes at the preferred point, the extraction step can be continued at ambient conditions, i.e. about 28.5° C., for about 30 minutes.

After the extraction step, certain insolubles will remain in the solution, and these insolubles may be removed by centrifugation. The residue from this centrifugation separation step contains proteins, minerals and crude fibers that may be used for animal feed.

At this point, the nonstorage protein whey, adjusted with additional alkali to pH 8.8 to 9.0, may be added to the storage protein extract to form a mixture that then may optionally, but preferably, be pasteurized to minimize or eliminate bacterial growth to further processing steps.

The alkali is added to the nonstorage protein whey in order to maintain the pH of the resulting mixture above about pH7, where storage protein would precipitate.

After the optional pasteurization step, the storage protein extract-nonstorage protein whey mixture will then be passed through a semipermeable membrane, commonly known as ultrafiltration, where the protein are filtered out of the solution on a molecular basis. Prior to the ultrafiltration step, the protein mixture may optionally be passed through a prefilter to remove insolubles, if desirable or if recommended by the ultrafiltration system guidelines.

In actual processing according to the present invention, the storage protein-nonstorage protein whey mixture was passed through an internally-coated tubular membrane manufactured by Abcor, Inc. This ultrafiltration unit included about 22 square feet of noncellulosic membrane area, and the feed temperature was maintained at about 65° C. and a pH of about 8.8 to 9.0. During the ultrafiltration processing, the feed was concentrated to about ¼ of the original volume by recirculating the retentate back to a reservoir and later recirculating it back through the ultrafiltration system. This concentrated solution of protein may optionally be diluted with filtered tap water or process water and then passed back through the ultrafiltration system to a final concentrate volume of about ¼ to 1/5 of the original feed volume in order to further purify the protein retentate. This retentate may then be passed to a spray dryer to produce the storage protein isolate having the improved characteristics of the present invention.

The permeate from the ultrafiltration system may be passed through a reverse osmosis membrane system, such as that manufactured by Western Dynetics, Inc. Such a system includes 10 square feet of membrane area cast on the exterior of 3-foot length, ⅜ inch diameter ceramic support cores. The permeate from the ultrafiltration system was restricted in actual operations to a temperature under 49° C. and the pH was maintained at about 7. Membranes used were rated as having a rejection for 5,000 ppm sodium chloride of about 90% at 500 p.s.i. The dilution technique is preferably not employed in the reverse osmosis membrane operation, since the objective is to retain and remove the ultrafiltration permeate constituents from the reverse osmosis effluent. The retentate from the reverse osmosis membrane operation may be conveyed to a dryer for concentration as a fertilizer or an animal food ingredient. The permeate from the reverse osmosis membrane system is essentially clarified water that may be recirculated back to the original extraction step as recycle water or alternatively back to the alkali extraction step for the extraction of storage protein from the initial residue.

Table 1 sets forth the amino acid composition of nonstorage protein and storage protein products produced from the process of this invention, wherein approximately 4 times as much storage protein isolate is produced as nonstorage protein concentrate.

Table 2 sets out the percentage of soluble nitrogen in the nonstorage protein product and the storage protein isolate produced by the present invention. It might be noted that it was expected that the highly soluble whey protein would enhance the nitrogen solubility profile of the storage protein isolate. However, the solubility as shown in Table 2 was overall slightly lower than that previously obtained when ultrafiltering nonstorage protein and storage protein extract separately as reported in the *Journal of Food Science,* Vol. 42, No. 2, pages 389-394 (1977). However, the results set out in Table 2 were from work conducted on a batch concentration rather than in a commercial type continuous operation with multiple ultrafiltration stages. Therefore, the longer residence times in the batch operation subjects the protein to more drastic effects. Nevertheless, the nitrogen solubilities for storage protein isolate with the whey proteins were lower than that for storage protein isolate from storage protein extract alone with both being processed in a batch operation at 65° C.

Analyses from the products of this invention are set out in Table 3. As shown there, the nonstorage protein is a concentrate, i.e. more than 70% protein (on a dry weight basis), with an 80.2% protein content, while the storage protein product is an isolate containing about 92.7% protein. As indicated in Table 3, the protein content is derived by the formula 6.25 times the total nitrogen in the particular product. Both the nonstorage protein concentrate and the storage protein isolate are relatively low in total sugars, crude fiber and free gossypol, and are in fact well below the 0.045% of free gossypol that is the upper limit permitted by the Food and Drug Administration. Likewise, both the nonstorage protein concentrate and the storage protein isolate are relatively low in phosphorus and oil. The numbers given in the column designated "Color", where higher numbers indicate lighter appearances, show that the storage protein isolate has a relatively light color.

Therefore, both the nonstorage protein concentrate and the storage protein isolate are suitable for use in food products. The storage protein isolate is particularly suited for use in breads, tortillas, in smooth ice cream formulas, and as a partial ground beef replacement in meat loaves.

The retentate from the reverse osmosis filtration system includes a relatively high percentage of sugars, and therefore would be suitable as a fertilizer or an animal food ingredient, and perhaps even as a fermentation substrate. Likewise this product is well under the Food and Drug Administration upper limit in free gossypol.

The residue product from centrifugation to separate the storage protein extract contains protein and a crude fiberous material suitable for animal feed. As indicated, this material is likewise well under the upper limit permitted by the FDA in amount of free gossypol.

Protein efficiency ratio (PER) data were also obtained by standard 28-day rat feeding trials using the nonstorage protein and storage protein products of the present invention. PER values were 2.82 for nonstorage protein concentrate and 1.3 for storage protein isolate containing the nonstorage protein whey constituent. This data compared with PERs of 2.91 and 1.2 for nonstorage protein and storage protein products obtained by the process set out in the *Journal of Food Science,* Vol. 42, No. 2, pages 389-394 (1977). It is believed that the PER as well as the solubility characteristics of the products produced by this invention could be improved by utilizing a continuous multi-stage ultrafiltration system, rather than a batch concentration operation as explained above. In the batch operation, some lysinoalanine may be generated because of the extended processing time at pH 9 and at 65° C. This generation of lysinoalanine may be eliminated by using the continuous, multi-stage ultrafiltration system with shorter residence time. However, to substantially improve PERs of the products of this invention, it may be necessary to enhance the ratio of amino acids.

TABLES 1, 2 & 3

Moisture, total solids, oil, free and total gossypol, crude fiber and ash set forth in Tables 1, 2 and 3 were determined according to standard AOCS methods. Nitrogen was determined by the interchangeable micro and macro Kjeldahl methods. Total sugars in terms of glucose were measured colorimetrically by the phenol-sulfuric acid method of Dubois, M., et al. 1956. Colorimetric Method for Determination of Sugars and Related Substances, *Anal. Chem.* 8:350. Total phosphorus was determined by the method according to Sumner, J. B. 1944. A Method for the Colorimetric Determination of Phosphorus *Science* 100:413. Color measurements were made using a Hunter Digital Color and Color Difference Meter, Model 25D. Colors were first read on products in a dry, powdered form and subsequently as a wet paste prepared by adding water (5:1 water to product ratio by wt.). Nonprotein nitrogen (NPN) was determined as that nitrogen soluble in 10% TCA solution. Nitrogen solubility profiles were prepared on products following a modification of a method by Lyman, et al. as previously described by Lawhon, J. T., et al. 1972. Evaluation of Protein Concentrate Produced from Glandless Cottonseed Flour by a Wet-Extraction Process, *Journal of Food Science* 37:778. Viscosity was measured with a Brookfield Model LVT viscosimeter with an Ultra-Low Viscosity adapter (a cylindrical spindle mounted symmetrically within a concentrate tube) in a constant temperature water bath maintained at the run temperature.

Amino acid analyses (with the exception of tryptophan and cystine) were quantitatively measured by the procedure of Spackman, D. H., et al. 1958. Automatic Recording Apparatus for Use in the Chromatography of Amino Acid. *Anal. Chem.* 30:1190. Tryptophan was determined by the method of Kohler, G. O., et al. 1967. Studies on Methods for Amino Acid Analysis of Wheat Products. *Cereal Chem.* 44:512. Cystine was measured using a modification of the procedure of Schram, E., et al. 1954. Chromatographic Determination of Cystine as Cystic Acid. *Biochem Journal* 57:33.

Samples were hydrolyzed for determination of all amino acids except cystine and tryptophan in constant-boiling HCl for 24 hr. under a nitrogen flush. Procedures for preparing protein hydrolysate for cystine and tryptophan are specified in the methods cited. Available lysine analyses were made following a method by Rhee, K. C., et al. 1974, presented at the 59th Annual Meeting of the American Assoc. of Cereal Chemists Montreal, October 1974, Abstract No. 170.

It will be apparent to those skilled in the art that various modifications may be made to the disclosed method without deviating from the overall inventive concept. For example, as set forth above a continuous, multi-stage ultrafiltration system may be used as an alternative to a batch operation procedure. Additionally, the optional pasteurization steps as set forth may be eliminated, if desirable or unnecessary.

TABLE 1

| Amino acid analysis of NSP and SP products from process of this invention | | |
|---|---|---|
| Amino Acids | NSP product g/16g N | SP isolate g/16g N |
| Lysine | 6.7 | 3.3 |
| Histidine | 2.6 | 2.8 |
| Ammonia | 1.9 | 1.9 |
| Arginine | 10.5 | 11.9 |
| Tryptophan | 1.7 | 1.6 |
| Cystine* | 3.9 | 1.0 |
| Aspartic acid | 7.8 | 8.8 |
| Threonine | 3.0 | 3.0 |
| Serine | 3.5 | 4.3 |
| Glutamic acid | 21.2 | 19.7 |
| Proline | 3.6 | 3.3 |
| Glycine | 3.5 | 3.9 |
| Alanine | 3.3 | 3.9 |
| Valine | 4.1 | 4.7 |
| Methionine | 1.7 | 1.6 |
| Isoleucine | 3.0 | 3.1 |
| Leucine | 5.6 | 5.9 |
| Tyrosine | 3.6 | 3.0 |
| Phenylalanine | 3.9 | 5.9 |
| Totals | 95.1 | 93.6 |
| Available lysine | 5.9 | 2.9 |

*Cystine as cysteic acid

TABLE 2

| Percentage of soluble nitrogen in products from the process of this invention | | | | | | | | | |
|---|---|---|---|---|---|---|---|---|---|
| Product description | pH of measurement | | | | | | | | |
| | 2.0 | 2.5 | 3.0 | 3.5 | 4.0 | 5.5 | 6.0 | 7.0 | 9.0 |
| NSP product | 57.6 | 55.8 | 42.2 | 31.0 | 24.8 | 49.6 | 62.0 | 59.6 | 86.5 |
| SP isolate | 78.2 | 54.9 | 54.7 | 43.5 | 14.3 | 16.4 | 17.2 | 19.7 | 49.2 |

TABLE 3

| Data on products from the process of this invention | | | | | | | | | | | | |
|---|---|---|---|---|---|---|---|---|---|---|---|---|
| | | % Dry wt. basis | | | | | | | | | | |
| Product description | Ash | Nitrogen | | Protein (N × 6.25) | Total sugars | Crude fiber | Gossypol | | Total Phos. | Oil | Color | |
| | | Total | NPN* | | | | Total | Free | | | Dry | Wet |
| NSP concentrate | 8.2 | 12.83 | 0.81 | 80.2 | 7.9 | 1.4 | 0.022 | 0.010 | 1.6 | 2.8 | 76.1 | 57.0 |
| SP isolate | 5.4 | 14.83 | 0.62 | 92.7 | 5.9 | 0.2 | 0.003 | 0.002 | 0.3 | 0.3 | 68.1 | 50.0 |
| RO product | 20.1 | 3.89 | 2.40 | 24.3 | 47.2 | negl. | 0.014 | 0.014 | 0.8 | 2.1 | 77.5 | 29.5 |
| Residue product | 11.8 | 3.98 | 0.38 | 24.8 | 1.5 | 15.0 | 0.210 | 0.010 | 3.7 | 7.2 | 81.7 | 58.7 |

*Designates nonprotein nitrogen

Accordingly, having sufficiently set forth and described our invention, we now claim:

1. A method of obtaining protein from oilseed, comprising the steps of:
   (a) extracting nonstorage protein from defatted oilseed flour or flakes by placing the oilseed flour or flakes in an aqueous solution to solubilize the nonstorage protein and then separating a storage protein-containing residue from the remaining solution;
   (b) removing nonstorage protein from the remaining solution by adjusting the pH of that solution to at or near the isoelectric point for nonstorage protein, and then separating the nonstorage protein curd precipitate from the solution, leaving a nonstorage protein whey;
   (c) extracting storage protein from the residue from Step (a) by placing that residue in an alkaline solution having a pH greater than about 8 to solubilize the storage protein, and then removing insoluble residue from the remaining alkaline solution;
   (d) intermixing the remaining alkaline solution of Step (c) and the nonstorage protein whey of Step (b) and maintaining the pH of the mixture above 7; and
   (e) separating protein from the mixture formed by Step (d) by filtration with a semipermeable membrane.

2. The protein product acquired by the performance of Step (e) in claim 1.

3. The method as defined in claim 1, wherein the oilseed is essentially deglanded or glandless cottonseed.

4. The method of claim 3, wherein the alkaline solution of Step (c) is prepared with either potassium hydroxide or sodium hydroxide.

5. The method as defined in claim 3, wherein the separating functions in Steps (a) and (b) are performed by centrifugation, and wherein the removing function in Step (c) is performed by centrifugation.

6. The method of claim 3, further including the Step of drying the nonstorage protein curd precipitate to achieve a concentrate product.

7. The method as defined in claim 3, wherein a permeate passes through the semipermeable membrane used in Step (e) and further including the Steps of:
   (f) passing the permeate from the filtration cycle in Step (e) through a reverse osmosis filtration system to achieve an essentially clarified water, and then
   (g) using the clarified water produced in Step (f) as recycle water for the extractions in Steps (a) and (c).

8. A method of deriving protein, comprising:
   (a) placing flour or flakes of defatted, essentially glandless cottonseed in water to solubilize the nonstorage protein fraction of the cottonseed;
   (b) separating a storage protein-containing residue from the nonstorage protein solution formed in Step (a).
   (c) adding an acid to the nonstorage protein solution to adjust the pH of that solution to about 4, and thereby causing nonstorage protein to precipitate from the solution;
   (d) separating the nonstorage protein precipitate from the solution to achieve a nonstorage protein whey;
   (e) placing the storage protein-containing residue of Step (b) in an aqueous solution having a pH of greater than about 9 to solubilize the storage protein;
   (f) removing insolubles from the solution of Step (e);
   (g) adding the nonstorage protein whey achieved in Step (d) to the solution achieved in Step (f); and
   (h) separating protein from the mixture formed by Step (g) by filtration with a semi-permeable membrane.

9. A protein product derived by the process comprising the steps of:
   with the use of water, extracting nonstorage protein from cottonseed flour or flakes to form a nonstorage protein solution and a storage-protein containing residue;
   separating the nonstorage protein solution from the storage-protein containing residue;
   with the use of an acid, causing a nonstorage protein curd to precipitate from the nonstorage protein solution, and then separating the precipitated curd from the solution to achieve a nonstorage protein whey;
   with the use of an alkali, extracting storage-protein from the previously formed storage-protein containing residue;
   mixing the extracted storage-protein and the nonstorage protein whey to form a mixture; and then
   separating a combined storage and non-storage whey protein product from the mixture, the protein product being comprised of at least 90% protein as determined by the formula 6.25 times the amount of nitrogen in the product.

* * * * *

UNITED STATES PATENT AND TRADEMARK OFFICE
CERTIFICATE OF CORRECTION

PATENT NO. : 4,332,719
DATED : June 1, 1982
INVENTOR(S) : J.Lawhon, et al.

It is certified that error appears in the above-identified patent and that said Letters Patent are hereby corrected as shown below:

Prior to the heading BACKGROUND OF THE INVENTION, in Column 1, the following statement is inserted:

"The Government has rights in this invention pursuant to Grant No. AER 77-20806 awarded by the National Science Foundation."

Column 5, line 5, after "growth" insert -- prior --

Column 7, line 6, delete "TABLES 1, 2, & 3".

Table 3, after "Residue product" insert -- (largely crude fiber) --.

Signed and Sealed this

Twenty-first Day of December 1982

[SEAL]

Attest:

GERALD J. MOSSINGHOFF

Attesting Officer

Commissioner of Patents and Trademarks